(12) United States Patent
Takeda et al.

(10) Patent No.: US 7,593,079 B2
(45) Date of Patent: Sep. 22, 2009

(54) OPTICAL DEVICE, LIGHT-CONDENSING BACKLIGHT SYSTEM, AND LIQUID CRYSTAL DISPLAY

(75) Inventors: Kentarou Takeda, Ibaraki (JP); Naoki Takahashi, Ibaraki (JP); Kazutaka Hara, Ibaraki (JP); Takahiro Fukuoka, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 485 days.

(21) Appl. No.: 10/556,688

(22) PCT Filed: Apr. 15, 2004

(86) PCT No.: PCT/JP2004/005386

§ 371 (c)(1),
(2), (4) Date: Nov. 14, 2005

(87) PCT Pub. No.: WO2004/104653

PCT Pub. Date: Dec. 2, 2004

(65) Prior Publication Data
US 2006/0238867 A1    Oct. 26, 2006

(30) Foreign Application Priority Data
May 19, 2003    (JP)    ............... 2003-140444

(51) Int. Cl.
*G02F 1/1335* (2006.01)
*G02F 1/13* (2006.01)
(52) U.S. Cl. ................. 349/117; 349/98; 349/99; 349/100; 349/101; 349/115; 349/185; 349/175
(58) Field of Classification Search ............ 349/96–98, 349/115, 117–121, 175–176, 99, 100, 101, 349/185
See application file for complete search history.

(56) References Cited

U.S. PATENT DOCUMENTS 5,430,566 A    7/1995    Sakaya et al.

(Continued)

FOREIGN PATENT DOCUMENTS

JP    05-196819    8/1993

(Continued)

OTHER PUBLICATIONS

International Preliminary Report on Patentability of corresponding International application No. PCT/JP2004/005386 mailed Mar. 23, 2006.

(Continued)

*Primary Examiner*—Julie Ngo
(74) *Attorney, Agent, or Firm*—Westerman, Hattori, Daniels & Adrian, LLP.

(57) ABSTRACT

An optical element of the invention comprises at least three laminated circular-polarization-type-reflection polarizers (a) whose wavelength bands for selective reflection of polarized light overlap one another; a layer (b1) which is placed between at least a pair of the circular-polarization-type-reflection polarizers (a) and has a front retardation of substantially zero (in the normal direction) and a retardation of at least $\lambda/8$ with respect to incident light inclined by at least 30° relative to the normal direction; and a layer (b2) which is placed between at least another pair of the circular-polarization-type-reflection polarizers (a) and has a front retardation of substantially zero (in the normal direction) and a retardation of at most $\lambda/2$ with respect to incident light inclined by 60° relative to the normal direction. The optical element condenses or collimates incident light from a light source and can control transmission of light at large incident angles relative to the normal direction, increase front brightness and reduce coloration.

13 Claims, 8 Drawing Sheets

U.S. PATENT DOCUMENTS

| | | | |
|---|---|---|---|
| 5,631,755 A | | 5/1997 | Sakaya et al. |
| 5,808,794 A | * | 9/1998 | Weber et al. ................ 359/487 |
| 6,624,936 B2 | * | 9/2003 | Kotchick et al. ............ 359/490 |
| 6,975,455 B1 | * | 12/2005 | Kotchick et al. ............ 359/487 |
| 2003/0193636 A1 | * | 10/2003 | Allen et al. ................. 349/117 |

FOREIGN PATENT DOCUMENTS

| | | |
|---|---|---|
| JP | 2561483 B2 | 9/1996 |
| JP | 11-349947 | 12/1999 |
| JP | 2002-311243 A | 10/2002 |
| JP | 2003-015134 A | 1/2003 |

OTHER PUBLICATIONS

Japanese Patent Application No. 2003-140444, Office Action—Notice of Reasons for Rejection dated Sep. 2, 2008.

* cited by examiner viewing-angle characteristics of brightness

OPTICAL DEVICE, LIGHT-CONDENSING BACKLIGHT SYSTEM, AND LIQUID CRYSTAL DISPLAY

TECHNICAL FIELD

The invention relates an optical element using a circular-polarization-type-reflection polarizer. The invention also relates to a condensing backlight system using the optical element and to a liquid crystal display using them.

BACKGROUND ART

In view of improvements in the visibility of liquid crystal displays, conventionally, techniques for efficiently introducing light from light sources to liquid crystal displays or the like generally employ light-condensing elements having a specific surface shape, such as prism sheets and lens array sheets, to condense outgoing light into the front direction and to increase the brightness.

However, such light-condensing elements having a specific surface shape have to be placed via an air layer, because, in principle, the condensation of light with such elements needs a relatively large difference in refractive index. Thus, the conventional techniques have problems such as an increase in the number of parts, light loss due to unnecessary scattering, surface damages, and visible contamination of the installed clearance with foreign matters.

A lighting system including a reflecting layer provided on the lower surface of a light guide plate and a reflection polarizer provided on the light-emitting side is also proposed for improvements of techniques in the brightness of emitting polarized light. As used herein, the term "reflection polarizer" means an element having the function of separating components of incident natural light into transmitted polarized light and reflected polarized light depending on the state of polarization.

It is disclosed that if a retardation plate that is controlled so as to have specifically different retardations with respect to vertical incident light and obliquely incident light is placed between polarizers, the angle distribution of transmitted lights can be restricted, and lights in or near the front direction can only be transmitted and other outside lights can be entirely absorbed when an absorption polarizer is used (for example, see Japanese Patent No. 2561483 and Japanese Patent Application Laid-Open (JP-A) No. 10-321025). If a reflection polarizer is used in place of the absorption polarizer, lights in or near the front direction can only be transmitted and other outside lights can be entirely reflected. According to this theory, lights emitted from a backlight can be condensed or collimated with no absorption loss.

A light-condensing system using such a reflection polarizer can be tens to hundreds µm in thickness even if the collimating layer of a thin film includes the reflection polarizer. Thus, such a system can be easily designed to be very thin relative to prism array or lens array sheets. Such the system needs no air interface and thus can be pasted for use. Thus, such the system is advantageous in handling terms. For example, if a cholesteric liquid crystal polymer (about 10 µm in thickness) is used as the reflection polarizer in combination with a thin coating film of a liquid crystal polymer (about 5 µm in thickness) serving as a retardation plate, which is laminated with an adhesive layer (about 5 µm in thickness), the total thickness of the resulting system can be as thin as 50 µm or less. If the respective layers are directly applied so as not to produce interfaces, the resulting system can be thinner.

DISCLOSURE OF INVENTION

A description will be given below of an ideal model of the mechanism of the simultaneous achievement of light condensation and brightness enhancement by the use of the reflection polarizer.

Natural light emitted from a light source is separated by a first reflection polarizer into transmitted polarized light and reflected polarized light. The transmitted polarized light in and near the normal direction can be transmitted through a given layer (hereinafter also referred to as "C-plate") having a front retardation of substantially zero (in the normal direction) and having a retardation of at least $\lambda/8$ with respect to incident light inclined by at least 30° relative to the normal direction. Such transmitted light can pass through a second reflection polarizer as it is. At angles inclined from the normal direction, the polarization state varies by the retardation effect so that polarized light components capable of being reflected by the second reflection polarizer can be increased. Such polarized light components are reflected by the second reflection polarizer. Particularly when the retardation is approximately $\lambda/2$, the lights are effectively reflected. The reflected polarized lights are retarded again to have changed polarization states in such a manner that they can pass through the first reflection polarizer and thus allowed to return to the light source unit through the first reflection polarizer. The reflected lights from the first and second reflection polarizers are depolarized by a diffuse reflection plate or the like placed under the light source, and the direction of the reflected lights is also changed by the diffuse reflection plate or the like. Part of the returning lights undergo repeated reflection until they become polarized lights in and near the normal direction, which can be transmitted through the reflection polarizer, and thus they can contribute to an improvement in brightness.

If the reflection polarizer comprises a planar structure of a cholesteric liquid crystal phase for separation of circularly polarized light, the C-plate can generate polarization conversion regardless of the azimuth angle. If the C-plate has a retardation of approximately $\lambda/2$ with respect to obliquely incident light, the incident light can be converted into just oppositely circularly polarized light.

If the C-plate is a retardation layer capable of converting incident light inclined by 30° relative to the normal direction into oppositely circularly polarized light, the transmitted lights can be concentrated substantially into the range of about $\pm 15°$ to about $\pm 20°$. However, a retardation of $\lambda/2$ can be generated only with respect to lights at specific incident angles. At angles more than or less than the specific angles, incident light cannot completely be converted into oppositely circularly polarized light. If the condensation of light is performed in such a degree, therefore, a retardation of more than $\lambda/2$ can be generated with respect to incident lights at angles of 50° or more so that they cannot completely be converted into oppositely circularly polarized light but can be converted into partially circularly polarized light and that part of the lights can not be reflected but can be transmitted. In particular, if light is more strongly condensed or collimated into the normal direction, the amount of transmission of light at large incident angles relative to the normal direction can be increased so that the front brightness can be significantly reduced and that coloration can be significant due to the transmitted light when the viewing angle is significantly tilted from the normal direction.

For example, if the system is designed to condense or collimate incident lights at angles of 30° or less relative to the normal direction, most of incident lights at angles of 50° or more relative to the normal direction can be transmitted without being reflected. Thus, there are problems in which the light reuse efficiency can be reduced, and the brightness in the normal direction can also be reduced, so that coloration can be caused by the transmitted light when the viewing angle is significantly tilted from the normal direction.

It is an object of the invention to provide an optical element that comprises a specific retardation layer between circular-polarization-type-reflection polarizers so as to condense or collimate incident light from a light source and can control transmission of light at large incident angles relative to the normal direction, increase front brightness and reduce coloration.

It is another object of the invention to provide a light-condensing backlight system using such an optical element and to provide a liquid crystal display using such an optical element.

The inventors have made active investigations to solve the above problems and have finally found the optical element as described below to complete the invention. Thus, the invention is as follows.

1. An optical element, comprising:
   at least three laminated circular-polarization-type-reflection polarizers (a) whose wavelength bands for selective reflection of polarized light overlap one another;
   a layer (b1) which is placed between at least a pair of the circular-polarization-type-reflection polarizers (a) and has a front retardation of substantially zero (in the normal direction) and a retardation of at least $\lambda/8$ with respect to incident light inclined by at least 30° relative to the normal direction; and
   a layer (b2) which is placed between at least another pair of the circular-polarization-type-reflection polarizers (a) and has a front retardation of substantially zero (in the normal direction) and a retardation of at most $\lambda/2$ with respect to incident light inclined by 60° relative to the normal direction.

2. The optical element according to above-mentioned 1, wherein the circular-polarization-type-reflection polarizer (a), the retardation layer (b1), the circular-polarization-type-reflection polarizer (a), the retardation layer (b2) and the circular-polarization-type-reflection polarizer (a) are laminated in this order.

3. The optical element according to above-mentioned 1, wherein
   the circular-polarization-type-reflection polarizer (a), the retardation layer (b1), the circular-polarization-type-reflection polarizer (a), the retardation layer (b2) and the circular-polarization-type-reflection polarizer (a) are arranged and laminated in this order from a light source side,
   the sum of retardations that are generated with respect to incident light inclined by at least 30° relative to the normal direction is adjusted to be from $\lambda/4+\lambda\cdot n$ to $3\lambda/4+\lambda\cdot n$, wherein n is an integer of 0 or more, where from the incident light is separated to polarized light by the first circular-polarization-type-reflection polarizer (a) from the light source side to the incident light is separated to polarized light through the first circular-polarization-type-reflection polarizer (a), the retardation layer (b1) and the second circular-polarization-type-reflection polarizer (a) in this order from the light source side, and
   the sum of retardations that are generated with respect to incident light inclined by 60° relative to the normal direction is adjusted to be from $\lambda/4+\lambda\cdot n$ to $3\lambda/4+\lambda\cdot n$, wherein n is an integer of 0 or more, where from the incident light is separated to polarized light by the first circular-polarization-type-reflection polarizer (a) from the light source side to the incident light is separated to polarized light through the first circular-polarization-type-reflection polarizer (a), the retardation layer (b1), the second circular-polarization-type-reflection polarizer (a), the retardation layer (b2) and the third circular-polarization-type-reflection polarizer (a) in this order from the light source side.

4. The optical element according to above-mentioned 1, wherein
   the circular-polarization-type-reflection polarizer (a), the retardation layer (b2), the circular-polarization-type-reflection polarizer (a), the retardation layer (b1) and the circular-polarization-type-reflection polarizer (a) are arranged and laminated in this order from a light source side,
   the sum of retardations that are generated with respect to incident light inclined by 60° relative to the normal direction is adjusted to be from $\lambda/4+\lambda\cdot n$ to $3\lambda/4+\lambda\cdot n$, wherein n is an integer of 0 or more, where from the incident light is separated to polarized light by the first circular-polarization-type-reflection polarizer (a) from the light source side to the incident light is separated to polarized light through the first circular-polarization-type-reflection polarizer (a), the retardation layer (b2) and the second circular-polarization-type-reflection polarizer (a) in this order from the light source side, and
   the sum of retardations that are generated with respect to incident light inclined by at least 30° relative to the normal direction is adjusted to be from $\lambda/4+\lambda\cdot n$ to $3\sim/4+\lambda\cdot n$, wherein n is an integer of 0 or more, where from the incident light is separated to polarized light by the first circular-polarization-type-reflection polarizer (a) from the light source side to the incident light is separated to polarized light through the first circular-polarization-type-reflection polarizer (a), the retardation layer (b2), the second circular-polarization-type-reflection polarizer (a), the retardation layer (b1) and the third circular-polarization-type-reflection polarizer (a) in this order from the light source side.

5. The optical element according to any one of above-mentioned 1 to 4, wherein the selective reflection wavelength of the at least three circular-polarization-type-reflection polarizers (a) are overlapped in the wavelength range of 550 nm±10 nm.

6. The optical element according to any one of above-mentioned 1 to 5, wherein the circular-polarization-type-reflection polarizer (a) comprises a cholesteric liquid crystal material.

7. The optical element according to any one of above-mentioned 1 to 6, wherein the retardation layer (b1) and/or the retardation layer (b2) is at least one selected from the group consisting of:
   a layer of a cholesteric liquid crystal phase having a selective reflection wavelength band in a range other than the visible light range and having a fixed planar alignment;
   a layer of a rod-like liquid crystal having a fixed homeotropic alignment state;
   a layer of a discotic liquid crystal having a fixed alignment state of a nematic phase or a columnar phase;
   a layer of a biaxially-oriented polymer film;
   a layer of a negative uniaxial inorganic layered compound having an optical axis aligned and fixed in the normal direction of a plane; and
   a film produced with at least one polymer selected from the group consisting of polyamide, polyimide, polyester, poly(etherketone), poly(amide-imide), and poly(ester-imide).

8. The optical element according to any one of above-mentioned 1 to 7, further comprising a $\lambda/4$ plate which is placed on the circular-polarization-type-reflection polarizer (a) provided on a viewer side (liquid crystal side) such that transmitted light from a light source side can provide linearly polarized light.

9. The optical element according to above-mentioned 8, further comprising a polarizing plate which is placed on the λ/4 plate side in such a manner that the direction of the transmission axis of the polarizing plate is parallel with the direction of the axis of the linearly polarized light to be transmitted from the light source side.

10. The optical element according to any one of above-mentioned 1 to 9, wherein each layer is laminated with a transparent adhesive or pressure-sensitive adhesive.

11. A condensing backlight system, comprising:
the optical element according to any one of above-mentioned 1 to 10; and
at least a light source provided for the optical element.

12. A liquid crystal display, comprising:
the condensing backlight system according to above-mentioned 11; and
at least a liquid crystal cell provided for the system.

13. A liquid crystal display, comprising:
the liquid crystal display according to above-mentioned 12; and
a diffusing plate which exhibits neither backward scattering nor depolarization and is laminated on a viewer side of the liquid crystal cell.

(Mechanisms and Effects)

The optical element of the invention includes: at least three laminated circular-polarization-type-reflection polarizers (a) whose wavelength bands for selective reflection of polarized light overlap one another; and retardation layers (b1) and (b2) which are each placed between the polarizers (a) and each have a front retardation of substantially zero and exhibit specific retardation values with respect to incident light at different oblique angles. In the optical element, part of the light transmitted at different oblique angles through the circular-polarization-type-reflection polarizer (a) on the incidence side can be totally reflected by the circular-polarization-type-reflection polarizer (a) on the emitted side. According to this mechanism, a collimating system can be formed which can control transmission of light at large incident angles relative to the normal direction and can improve the front brightness and the degree of polarization and reduce coloration. Thus, a liquid crystal display having the optical element placed on a source of backlight to be condensed or collimated can use lights only in a high-quality-display region at or near the front direction.

The optical element of the invention provides a collimating system that can be easily designed to be thin. The optical element of the invention can be laminated with paste for use and thus is advantageous in terms of handling. A combination of the condensing backlight source using the optical element and a diffusing plate that produces less backward scattering and no depolarization can form a viewing angle-expanding system.

The condensing backlight system using the resulting optical element can easily provide a highly collimating light source as compared with the conventional system. In addition, collimation is achieved using reflected polarized light with substantially no absorption loss in such a manner that a cycle is repeated in which reflected uncollimated light components return to the backlight side and undergo scattering, reflection and the like so as to give collimated light components which can only be output, so that substantially high transmittance and high light use efficiency can be achieved.

BRIEF DESCRIPTION OF DRAWING

In FIGS. 1 to 6, reference characters A and A' represent an optical element, a: the circular-polarization-type-reflection polarizer, b1 and b2: retardation layers, B: a λ/4 plate, C: a polarizing plate, and D: a backlight, respectively.

BEST MODE FOR CARRYING OUT THE INVENTION

Figure 1:
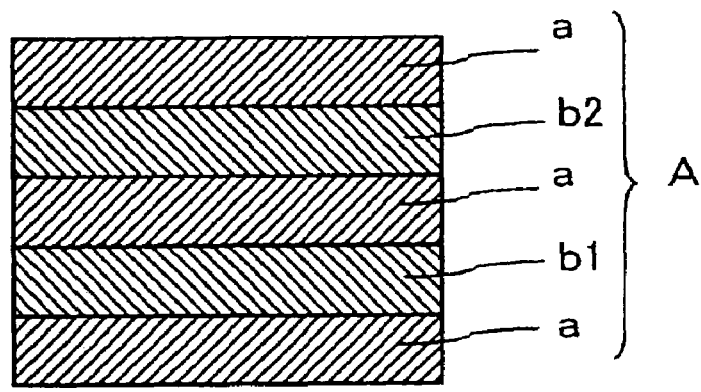
FIG. 1 is a cross-sectional view showing an example of the optical element according to the invention.

The invention is described below with reference to the drawings. FIG. 1 is a cross-sectional view showing an optical element (A), which includes: three laminated circular-polarization-type-reflection polarizers (a); a layer (b1) which is placed between a pair of the circular-polarization-type-reflection polarizers (a) and has a front retardation of substantially zero (in the normal direction) and a retardation of λ/8 or more with respect to incident light inclined by at least 30° relative to the normal direction; and a layer (b2) which is placed between another pair of the circular-polarization-type-reflection polarizers (a) and has a front retardation of substantially zero (in the normal direction) and a retardation of 0 to λ/2 with respect to incident light inclined by 60° relative to the normal direction. In the optical element (A) of FIG. 1, any side of the circular-polarization-type-reflection polarizers (a) may be placed on the light source side.

Figure 2:
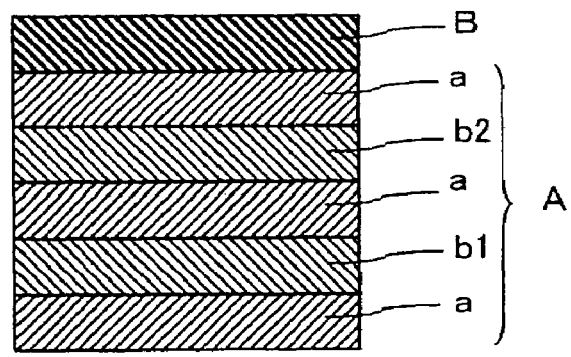
FIG. 2 is a cross-sectional view showing an example of the optical element according to the invention.
Figure 3:
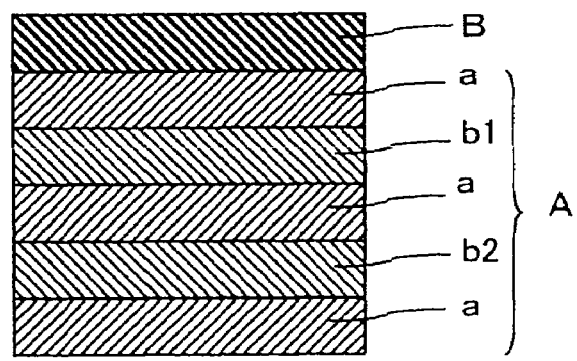
FIG. 3 is a cross-sectional view showing an example of the optical element according to the invention.

FIGS. 2 and 3 each show a case where a λ/4 plate (B) is placed on the optical element (A) such that transmitted light from the light source side can be converted into linearly polarized light. The λ/4 plate (B) is placed on the circularpolarization-type-reflection polarizer (a) that is provided on the viewer side (the liquid crystal side). While the positions of the retardation layers (b1) and (b2) in FIG. 2 are opposite to those in FIG. 3, in any case, the retardation values of the retardation layers (b1) and (b2) should each preferably be controlled in a specific range.

The number of the circular-polarization-type-reflection polarizers (a) may be any number of at least 3. The leak in oblique directions can be similarly reduced using four or more pieces of the circular-polarization-type-reflection polarizer (a). In a case where four pieces of the circular-polarization-type-reflection polarizer (a) are used, for example, another retardation layer that is designed to produce a retardation of preferably about $\lambda/2$ with respect to incident light inclined by 45° relative to the normal direction may be provided between another pair of the circular-polarization-type-reflection polarizers (a) in addition to the retardation layers (b1) and (b2) so that improved efficiency of reflection of obliquely incident light can be provided. However, other problems such as cost, necessary film thickness, and increased defects due to the increased number of layers can easily occur, and thus the number of the circular-polarization-type-reflection polarizer layers (a) is preferably controlled from 3 to 5.

(Circular-Polarization-Type-Reflection Polarizer (a))

For example, a cholesteric liquid crystal material is used in a circular-polarization-type-reflection polarizer (a). In viewpoint of brightness enhancement, it is preferable to achieve total reflection for lights having wavelength of around 550 nm with high visibility, and preferable to overlapped at least in the wavelength range of 550 nm±10 nm of the selective reflection wavelength bands of the reflection polarizers (a). In the reflection polarizer (a), a central wavelength in selective reflection is determined by a formula $\lambda$=np (wherein n indicates a refractive index of a cholesteric material and p indicates a chiral pitch). For obliquely incident light, the overlapped wavelength region is preferably wider since a selective reflection wavelength is subjected to a blue shift. Also, in view of coloration and RGB response for liquid crystal displays, the reflection wavelength bands more preferably overlap in the entire visible light range from 380 nm to 780 nm. From this standpoint, the reflection polarizers used in combination may be the same, or one capable of reflecting light at all visible wavelengths may be used in combination with another capable of reflecting light at some but not all visible wavelengths.

In a case where a circular-polarization-type-reflection polarizer (a) is made of a cholesteric materials, a similar polarizer can be obtained even in combination of different types (which are of a right hand twist and a left hand twist) in a way such that according to a similar way of thinking, a retardation is zero or $\lambda$ if a front retardation is inclined at $\lambda/2$, whereas the similar polarizer is unprofitable since a problem arises because of anisotropy or coloring abnormality according to an azimuth of the inclined axis. From such a viewpoint, it is preferable to combine members of the same type (between only members with a right hand twist or only members with a left hand twist).

A proper cholesteric liquid crystal may be used as a cholesteric liquid crystal constituting a circular-polarization-type-reflection polarizer (a) without imposing any specific limitation in the present invention. Examples thereof that are named include: a liquid crystal polymer exhibiting a cholesteric liquid crystallinity at a high temperature; a polymerized liquid crystal obtained by polymerizing a liquid crystal monomer, and a chiral agent and an alignment agent, when both are required, with illumination of ionizing radiation such as an electron beam, ultraviolet or the like, or with heating; and a mixture thereof. While a liquid crystallinity may be either lyotropic or thermotropic, a thermotropic liquid crystal is desirable from the view point of ease of control and formability of monodomain.

Formation of a cholesteric liquid crystal layer can be performed by means of a method in conformity with a conventional alignment treatment. Exemplified are: a method in which a liquid crystal polymer is developed on a proper alignment film selected from the group: an alignment film obtained by being subjected to a rubbing treatment with a rayon cloth or the like on a film made of polyimide, polyvinyl alcohol, polyester, polyarylate, polyamide imide, polyether imide or the like formed on a support base material having as low a birefringence retardation as possible such as triacetyl cellulose, amorphous polyolefin or the like; an alignment film made of an obliquely evaporated layer made of SiO; an alignment film performed stretching or the like, and the liquid crystal polymer is heated at a temperature of a glass transition temperature or higher and lower than an isotropic phase transition temperature and cooled at a temperature lower than the glass transition temperature in a planar alignment state of the liquid crystal polymer molecules into a glassy state to thereby form a fixed layer in which the alignment is fixed; and other methods.

Film formation of a liquid crystal polymer can be performed by means of a method in which a liquid crystal polymer is developed into a thin film using a solution of the liquid crystal polymer with a solvent with one of the following techniques: such as a spin coating method; a roll coating method, a flow coating method; a printing method; a dip coating method; a flow film forming method; a bar coating method; a gravure printing method and others, to further dry the thin film, when required. Examples of the solvent that can be properly used include: methylene chloride, cyclohexanone, trichloroethylene, tetrachloroethane, N-methylpyrrolidone, tetrahydrofuran and others.

One of methods can be adopted in which a heat-melt of a liquid crystal polymer and preferably a heat-melt in a state exhibiting an isotropic phase is developed in a procedure in conformity with a procedure as described above, the developed film is further developed to a thinner film while a melting temperature is maintained, if necessary, and the thinner film is then solidified. The one method is a method using no solvent; therefore, a liquid crystal polymer can be developed by a method good in hygiene in a working environment as well. Note that in development of a liquid crystal polymer, there can be adopted a superimposition scheme for cholesteric liquid crystal layers with alignment films interposed between layers for the purpose to realize a thinner, if necessary.

One of the optical layers can also be separated from a support base material/an alignment base material therefore used in film formation and transferred onto another optical material for use when required.

Alternatively, as the circular-polarization-type-reflection polarizer (a) according to the invention, a combination of a linear-polarization-type-reflection polarizer and a $\lambda/4$ plate may be used. A single piece of the combination or two or more pieces of the combination may be used. All the polarizers (a) may each be the combination of a linear-polarization-type-reflection polarizer and a $\lambda/4$ plate.

Examples of the linear-polarization-type-reflection polarizer include: a grid type polarizer; a multilayer thin film laminate with two or more layers made of two or more kinds of materials having a difference between refractive indexes;

evaporated multilayer thin film having different refractive indexes used in a beam splitter or the like; a multi-birefringence layer thin film laminate with two or more layers made of two or more kinds of materials each having birefringence; a stretched resin laminate with two or more layers using two or more kinds of resins each having a birefringence; a polarizer separating linearly polarized light by reflecting/transmitting linearly polarized light in the axis directions perpendicular to each other; and others.

A uniaxially stretched multilayer laminate can be used that is obtained by uniaxially stretching a multilayer laminate obtained by alternately laminating materials generating a retardation by stretching represented by polyethylene naphthalate, polyethylene terephthalate and polycarbonate; and resins each generating a low retardation, such as an acrylic resin represented by polymethacrylate; and a norbornene resin and others represented by ARTON manufactured by JSR Corp.

Figure 4:
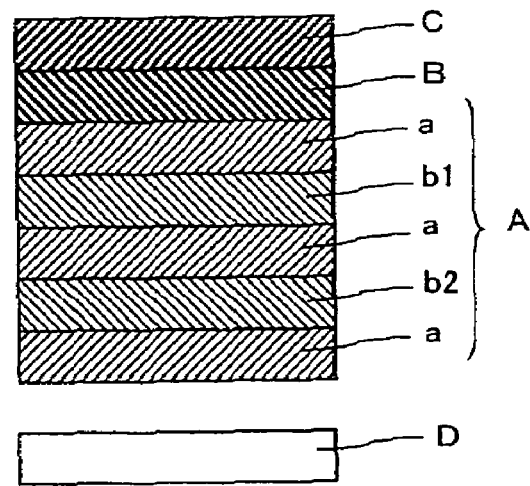
FIG. 4 is a cross-sectional view showing an example of the liquid crystal display according to the invention.

When as the circular-polarization-type-reflection polarizer (a) that is the combination of a linear-polarization-type-reflection polarizer and a $\lambda/4$ plate is used as an intermediate layer (for example, as the second polarizer (a) of the three laminated polarizers (a) from the backlight side), the $\lambda/4$ plate is placed on each of both sides of the linear-polarization-type-reflection polarizer. When the combination is used for the lowermost layer (for example, as the first polarizer (a) of the three laminated polarizers (a) from the backlight side), the linear-polarization-type-reflection polarizer and the $\lambda/4$ plate are arranged in this order from the backlight side. When the combination is used for the uppermost layer (for example, as the third polarizer (a) of the three laminated polarizers (a) from the backlight side), the $\lambda/4$ plate and the linear-polarization-type-reflection polarizer are arranged in this order from the backlight side. When the circular-polarization-type-reflection polarizer (a) that is the combination of a linear-polarization-type-reflection polarizer and a $\lambda/4$ plate is used for the uppermost layer, the $\lambda/4$ plate (B) does not have to be placed on the optical element (A) as shown in FIG. 2, 3 or 4.

(Retardation Layer (b))

Each of the retardation layers (b1) and (b2) placed between the circular-polarization-type-reflection polarizers (a) has a retardation of substantially zero in the front direction. The front retardation is preferably at most $\lambda/10$ for the purpose of maintaining vertically-incident polarized light.

The retardation layer (b1) has a retardation of at least $\lambda/8$ with respect to incident light at an angle of 30° relative to the normal direction, while the retardation layer (b2) has a retardation of at most $\lambda/2$ with respect to incident light inclined by 60° relative to the normal direction.

Ideally, the retardation layers (b1) and (b2) each having a retardation of $\lambda/2$ are effective. However, the circular-polarization-type-reflection polarizer (a), specifically the cholesteric liquid crystal layer itself, has certain retardation. Therefore, the state of polarization of transmitted light through the circular-polarization-type-reflection polarizer (a) can also vary due to the C-plate-like birefringence of the reflection polarizer itself. Thus, with respect to the retardation of the generally inserted C-plate measured at the specific angle, it is preferred that the sum of the retardations of the circular-polarization-type-reflection polarizer (a) and the C-plate should be about $\lambda/2$ for transmission of incident light.

In consideration of the retardation of the circular-polarization-type-reflection polarizers (a), for the correction of them, there are used the retardation layer (b1) having a retardation of at least $\lambda/8$ with respect to incident light at an angle of 30° relative to the normal direction and the retardation layer (b2) having a retardation of at most $\lambda/2$ with respect to incident light inclined by 60° relative to the normal direction. The retardation of each of the retardation layers (b1) and (b2) with respect to obliquely incident light is properly adjusted depending on the circular-polarization-type-reflection polarizer (a).

If the sum of the retardations that are generated with respect to obliquely incident light through the retardation layers (b1) and (b2) and the circular-polarization-type-reflection polarizers (a) is about $\lambda/2$, the resulting circularly-polarized light can be just opposite to the incident light. It is known that reflection polarizers can serve as a retardation layer with respect to obliquely incident light (H. Takezone et al., JPN. J. Appl. Phys. 22, 1080 (1983)).

The retardation layers (b1) and (b2) may be properly determined depending on the total reflection angle for efficient conversion of obliquely incident light into polarized light. In order to completely totally reflect incident light inclined by 60° relative to the normal direction, for example, the total of the retardations of the circular-polarization-type-reflection polarizer (a) and the retardation layer (b2) measured at an incident angle of 60° is preferably controlled to be about $\lambda/2$. In this case, however, the reflection can be weak at or near an incident angle of 30°, and thus the total of the retardations of another circular-polarization-type-reflection polarizer (a) and the retardation layer (b1) is controlled to be about $\lambda/2$ such that incident light at or near an incident angle of 30° can be totally reflected by the another circular-polarization-type-reflection polarizer (a).

For example, a preferred mode of the optical element of the invention is as described below. The retardation layer (b2) is placed between the first and second circular-polarization-type-reflection polarizers (a) arranged in this order from the light source side, and the sum of retardations that are generated with respect to incident light inclined by at least 60° relative to the normal direction is adjusted to be from $\lambda/4+\lambda \cdot n$ to $3\lambda/4+\lambda \cdot n$, wherein n is an integer of 0 or more, where the incident light is separated to polarized light through the first circular-polarization-type-reflection polarizer (a), the retardation layer (b2) and the second circular-polarization-type-reflection polarizer (a) in this order from the light source side. The retardation layer (b1) is also placed between the second and third circular-polarization-type-reflection polarizers (a) arranged in this order from the light source side, and the sum of retardations that are generated with respect to incident light inclined by at least 30° relative to the normal direction is adjusted to be from $\lambda/4+\lambda \cdot n$ to $3\lambda/4+\lambda \cdot n$, wherein n is an integer of 0 or more, where the incident light is separated to polarized light through the first circular-polarization-type-reflection polarizer (a), the retardation layer (b2), the second circular-polarization-type-reflection polarizer (a), the retardation layer (b1) and the third circular-polarization-type-reflection polarizer (a) in this order from the light source side.

That is, in the case that the circular-polarization-type-reflection polarizer (a) has certain retardation, the sum of the retardations of the retardation layers (b1) and (b2) and the circular-polarization-type-reflection polarizers (a) is controlled to be in the range of $\lambda/4+\lambda n$ to $3\lambda/4+\lambda n$ as stated above so that the retardation layer (b2) can well reflect incident light at angles of about 40° to about 80° relative to the normal direction and particularly well reflect incident light at angles of about 50° to about 60°. And the retardation layer (b1) can well reflect incident light at incident angles of about 10° to about 50° relative to the normal direction and particularly well reflect incident light at incident angles of about 20° to about 40°. If the retardation layers (b1) and (b2) are controlled as described above, therefore, obliquely incident light can be efficiently reflected, and the amount of transmitted light or coloration can be reduced or controlled to be small even when the viewing angle is significantly tilted.

Thus, the total of the retardations is preferably controlled to be around $\lambda/2$. In each case, the total of the retardations is preferably from $\lambda/4+\lambda\cdot n$ to $3\lambda/4+\lambda\cdot n$, more preferably from $3\lambda/10$ to $7\lambda/10$, still more preferably from $2\lambda/5$ to $3\lambda/5$.

The optical element of the invention can strongly condense or collimate incident light in the normal direction and can significantly reduce the amount of transmission of light at large incident angles relative to the normal direction. As a result, the front brightness and the degree of polarization can be improved, and the coloration can be reduced in the case that the viewing angle is significantly tilted relative to the normal direction.

In the above embodiment, the retardation layer (b2) is placed between the first and second circular-polarization-type-reflection polarizers (a) arranged in this order from the light source side, and the retardation layer (b1) is placed between the second and third circular-polarization-type-reflection polarizers (a) arranged in this order from the light source side, conversely, the same effect can be obtained even if the retardation layers (b1) and (b2) are interchanged.

Any of materials can be used in the retardation layers (b1) and (b2) without a specific limitation as far as it has an optical characteristic as described above. Exemplified are: a layer having a fixed planar alignment state of a cholesteric liquid crystal having a selective reflection wavelength in a region outside a visible light region (ranging from 380 nm to 780 nm); a layer having a fixed homeotropic alignment state of a rod-like liquid crystal; a layer using columnar alignment or nematic alignment of a discotic liquid crystal; a layer in which a negative uniaxial crystal is aligned in a plane; a layer made of a biaxially aligned polymer film; and others. Examples thereof also include films produced with at least one polymer selected from the group consisting of polyamide, polyimide, polyester, poly(etherketone), poly(amide-imide), and poly (ester-imide). These films can be obtained through a process including the steps of dissolving the polymer in a solvent, applying the resulting solution to a substrate, and drying the solution. The substrate is preferably made of a material whose rate of change in dimension is at most 1% in the drying process. Examples thereof also include layers of a nematic or discotic liquid crystal whose alignment direction is fixed so as to continuously vary in the thickness direction.

A C-plate having a fixed planar alignment state of a cholesteric liquid crystal having a selective reflection wavelength in a region outside the visible light region (ranging from 380 nm to 780 nm) is desirable to have no coloring abnormality in the visible light region with respect to a selective reflection wavelength of a cholesteric liquid crystal. Hence, a necessity arises for a selective reflection light not to be in the visible region. Selective reflection is specially determined by a cholesteric chiral pitch and a refractive index of a liquid crystal. A value of a central wavelength in selective reflection may be in the near infrared region, whereas it is more desirably in an ultraviolet region of 350 nm or less because of an influence of optical rotation exerted or occurrence of a slightly complex phenomenon. Formation of a cholesteric liquid crystal layer is performed in a similar way to that in formation of a cholesteric liquid crystal layer in the reflection polarizer described above.

A C-plate having a fixed homeotropic alignment state is made of a liquid crystalline thermoplastic resin showing a nematic liquid crystallinity at a high temperature; a polymerized liquid crystal obtained by polymerizing a liquid crystal monomer and an alignment agent, when required, under illumination with ionizing radiation such as an electron beam, ultraviolet or the like, or with heating; or a mixture thereof. While a liquid crystallinity may be either lyotropic or thermotropic, a thermotropic liquid crystal is desirable from the view point of ease of control and formability of monodomain. A homeotropic orientation is obtained for example in a procedure in which a birefringent material described above is coated on a film made of a vertically aligned film (such as a film of a long chain alkylsilane) and a liquid crystal state is produced and fixed in the film.

As a C-plate using a discotic liquid crystal, there is available a plate obtained by producing and fixing a nematic phase or a columnar phase in a discotic liquid crystal material having an optically negative uniaxiality such as a phthalocyanines or a triphenylene compounds each having an in-plane spread molecule as a liquid crystal material. Inorganic layered compounds each with a negative uniaxiality are detailed in a publication of JP-A No. 6-82777 and others.

A C-plate using a biaxial alignment of a polymer film can be obtained by one of the following methods, in which a polymer film having positive refractive index anisotropy is biaxially stretched in a good balance; in which a thermoplastic resin is pressed; and in which a C-plate is cut off from a parallel aligned crystal.

Each retardation layer (b) may be made of a single piece of retardation plate or may be made of two or more pieces of retardation plates for the desired retardation.

(Lamination of Layers)

Lamination of each of the layers may be realized only by being laminated on a preceding layer, while it is preferable to laminate the layers with an adhesive agent or a pressure-sensitive adhesive agent from the viewpoint of workability and light utilization efficiency. In that case, it is desirable from the viewpoint of suppressed surface reflection that an adhesive agent or a pressure-sensitive adhesive agent is transparent and does not have absorption in the visible light region, and have refractive indexes closest possible to refractive indexes of the layers. Preferably used from the view point are an acrylic pressure-sensitive adhesive agent and the like. The following methods can be adopted: one method in which each of the layers forms monodomain with the help of an alignment film separately from the others and sequentially laminated by transfer the layers onto a light transparent base material; and the other in which each of the layers is sequentially formed directly on a preceding layer while forming an alignment film or the like for alignment in a proper manner.

It is possible to further add particles for adjusting diffusibility, when required, to thereby impart isotropic scatterbility, and to properly add an ultraviolet absorbent, an antioxidant, and a surfactant for a purpose to impartation of a leveling property in film formation, in each of the layers and (pressure-sensitive) adhesive layers.

(Condensing Backlight System)

A diffuse reflection plate is preferably placed on the lower side of a light guide plate constituting the light source (on the side opposite to the side where a liquid crystal cell is placed). The light to be reflected by the collimating film is mainly composed of obliquely incident light components. Such light components are specularly reflected by the collimating film and allowed to return to the backlight direction. If the reflecting plate on the back side is highly specularly reflective, the angle of reflection will be maintained so that the light components cannot go out in the front direction to be lost. Thus, the diffuse reflection plate is preferably placed such that the angle of reflection of the returning reflected light cannot be maintained and that components scattered and reflected in the front direction can be increased.

An appropriate diffusing plate is preferably placed between the optical element (A: the collimating film) of the invention and the backlight source (D). In such a configuration, obliquely incident lights are reflected and scattered near the light guide of the backlight, and part of the lights are scattered in the vertical direction so that the light reuse efficiency can be increased. The diffusing plate may be a product having an irregular surface or may be produced by embedding fine particles with different refractive indices in a resin or any other method. The diffusing plate may be sandwiched between the optical element (the collimating film) and the backlight or may be laminated with paste to the collimating film.

If a liquid crystal cell laminated to the optical element (the collimating film) with paste is placed in the vicinity of the backlight, Newton's rings could be generated at a gap between the film surface and the backlight. If a diffusing plate having an irregular surface is placed on the light-guide-side surface of the optical element (the collimating film) of the invention, the generation of such Newton's rings can be controlled. Alternatively, the surface itself of the optical element (the collimating film) of the invention may be processed to form a layer capable of serving as an irregular structure and a light-diffusing structure at the same time.

(Liquid Crystal Displays)

The optical element is preferably applied to a liquid crystal display comprising a liquid crystal cell and polarizing plates provided on both sides of the liquid crystal cell. The optical element may be provided on the polarizing plate on the light source side of the liquid crystal cell, for example, as shown in FIG. 4. For the sake of convenience, only the polarizing plate (C) on the light source side of the liquid crystal panel is shown in FIG. 4.

Referring to FIG. 4, the optical element (A) is laminated on the polarizing plate (C) through a $\lambda/4$ plate (B). The $\lambda/4$ plate (B) converts circularly-polarized light from the optical element (A) into linearly-polarized light, which enters the polarizing plate (C). The $\lambda/4$ plate (B) and/or the polarizing plate (C) may be preliminarily laminated to form the optical element of the invention.

A diffusing plate that exhibits neither backward scattering nor depolarization may be laminated on the viewer side of the liquid crystal cell of the liquid crystal display having the combined collimating backlight. In such a configuration, lights with good display characteristics in or near the front direction can be diffused so that uniform and good display characteristics can be shown over all viewing angles and thus the viewing angle can be expanded.

A viewing angle magnifying film used here is a diffusion plate having substantially no backscattering. A diffusion plate can be provided with a diffusion pressure-sensitive material. An arrangement place thereof can be used above or below a polarizing plate on the viewer side of the liquid crystal display. In order to prevent reduction in contrast due to an influence such as bleeding of pixels or a slightly remaining backscattering, the diffusion plate is desirably provided in a layer at a position closest possible to a cell such as between a polarizing plate and a liquid crystal cell. In this case, it is desirable to use a film that does not substantially cancel polarization. A fine particle distribution type diffusion plate is preferably used, which is disclosed in, for example, the publications of JP-A No. 2000-347006 and JP-A No. 2000-347007.

In a case where a viewing angle magnifying film is disposed outside of a polarizing plate on the viewer side of a liquid crystal cell, a viewing angle compensating retardation plate may not be used especially if a TN liquid crystal cell is used since collimated lights are transmitted through a liquid crystal cell and through the polarizing plate. If an STN liquid crystal cell is used in the case, it has only to use a retardation film that is well compensated with respect to a front characteristic. Since, in this case, a viewing angle magnifying film has a surface exposed to air, a type having a refractive effect due to a surface profile can also be employed.

On the other hand, in a case where a viewing angle magnifying film is inserted between a polarizing plate and a liquid crystal cell, light is diffused light at the stage where light is transmitted through the polarizing plate. If a TN liquid crystal is used, a necessity arises for compensating a viewing angle characteristic of the polarizer itself. In this case, it is preferable to insert a retardation plate to compensate a viewing angle characteristic of a polarizing plate between the polarizing plate and the viewing angle magnifying film. If an STN liquid crystal is used, it is preferable to insert a retardation plate to compensate a viewing angle characteristic of the polarizing plate in addition to a front retardation compensation for the STN liquid crystal.

In a case of a viewing angle magnifying film having a regular structure in the interior thereof such as a microlens array or a hologram film, both conventionally having been available, interference has occurred with a fine structure such as a microlens array, a prism array, a louver, a micromirror array or the like that is included in a black matrix of a liquid crystal display or a collimation system of a conventional backlight to thereby cause a moiré pattern with ease. Since in a collimating film in this invention, a regular structure is not visually recognized in a plane thereof and emitted light has no regularity modulation, no necessity arises for consideration of matching with a viewing angle magnifying film or an arrangement sequence. Therefore, a viewing angle magnifying film has a lot of options since no specific limitation is imposed thereon, if neither interference nor a moiré pattern occurs with a pixel black matrix of a liquid crystal display.

In this invention, as viewing angle magnifying films, preferably used are a light scattering plate, having no substantial backscattering and not canceling polarization, which is described in any of the publications of JP-A Nos. 2000-347006 and 2000-347007 and which has a haze in the range of 80% to 90%. Any of layers each of which has a regular structure in the interior thereof such as a hologram sheet, a microprism array, a microlens array or the like can be used, if neither interference nor a moiré pattern occurs with a pixel black matrix of a liquid crystal display.

(Other Materials)

Note that various other kinds of optical layers are properly employed according a common method to thereby, manufacture a liquid crystal display.

A $\lambda/4$ plate in use is a proper retardation plate adapted for a purpose of use. The $\lambda/4$ plate can control an optical characteristic such as a retardation in lamination of two or more kinds of retardation plates. Examples of retardation plates include: birefrengent films obtained by stretching films made of proper polymers such as polycarbonate, norbornene resin, polyvinyl alcohol, polystyrene, polymethylmethacrylate, polypropylene, other polyolefins, polyarylate, polyamide and others; alignment films each made of a liquid crystal material such as a liquid crystal polymer; alignment layers each made of a liquid crystal material supported by a film; and others. In general, the λ/4 plate preferably has a thickness of 0.5 to 200 μm, particularly preferably of 1 to 100 μm.

A retardation plate functioning as a λ/4 plate in a broad wavelength range such as the visible light region can be obtained by a method in which, for example, a retardation layer functioning as a λ/4 plate for monochromatic light with a wavelength of 550 nm, a retardation layer exhibiting another retardation characteristic, for example a retardation layer functioning as a λ/2 plate are superimposed one on the other, or the like method. Therefore, a retardation plate inserted between a polarizing plate and a brightness enhancement film may be made with one, or two or more retardation layers.

A polarizing plate having a protective film on one side or both sides of a polarizer is usually used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials such as iodine is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As the transparent protective film prepared on one side or both sides of the polarizer, materials is excellent in transparency, mechanical strength, heat stability, water shielding property, isotropy, etc. may be preferably used. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned as a. Films made of heat curing type or ultraviolet ray curing type resins, such as acryl based, urethane based, acryl urethane based, epoxy based, and silicone based, etc. may be mentioned as materials of the above-mentioned transparent protective film.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in side chain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protection film, which can be determined arbitrarily, is about 1 to 500 μm, preferably 1 to 300 μm, and especially preferably 5 to 200 μm in viewpoint of strength, work handling and thin layer Moreover, it is preferable that the protective film may have as little coloring as possible. Accordingly, a protective film having a retardation value in a film thickness direction represented by $Rth=[(nx+ny)/2-nz] \times d$ of −90 nm to +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a retardation value (Rth) of −90 nm to +75 nm in a thickness direction. The retardation value (Rth) in a thickness direction is preferably −80 nm to +60 nm, and especially preferably −70 nm to +45 nm.

As a protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used. Adhesives are used for adhesion processing of the above described polarizer and the protective film. As adhesives, isocyanate derived adhesives, polyvinyl alcohol derived adhesives, gelatin derived adhesives, vinyl polymers derived latex type, aqueous polyurethane based adhesives, aqueous polyesters derived adhesives, etc. may be mentioned.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-crosslinked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the transparent protective film.

A retardation plate is laminated on a polarizing plate as a viewing angle compensating film and used as a wide viewing angle polarizing plate. A viewing angle compensating film is a film for magnifying a viewing angle so as to enable an image to be viewed with relatively sharpness even in a case where a screen image of a liquid crystal display is viewed not in a direction normal to the screen but in a slightly oblique direction relative to the screen.

As such viewing angle compensating retardation plates, there are available, in addition thereto, a film having a birefringence obtained by a biaxially stretching treatment, a stretching treatment in two directions perpendicular to each other or the like and a biaxially stretched film such as an inclined alignment film. As inclined alignment film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

No specific limitation is, in addition to the above described condition, imposed on optical layers laminated when being actually used and there can be used one, or two or more optical layers that have an opportunity to be used in formation of a liquid crystal display and others, such as a reflection plate and a transflective plate. Examples thereof especially include: a reflection type polarizing plate and a transflective type polarizing plate obtained by laminating a reflection plate and a transflective plate, respectively, on an elliptic polarizing plate or a circular polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a transflective type elliptically polarizing plate, etc. in which the above-mentioned reflection type polarizing plate or a transflective type polarizing plate is combined with above described retardation plate respectively.

The elliptically polarizing plate or a reflection type elliptically polarizing plate is laminate of a polarizing plate or a reflection type polarizing plate with a retardation plate in appropriately combination. While the elliptically polarizing plate or the likes described above can be formed by sequentially laminating layers such that in combination of the (reflection type) polarizing plate and the retardation plate one at a time in a manufacturing process for a liquid crystal display, an optical film such as an elliptically polarizing plate or the like obtained by lamination in advance has an advantage of being excellent in quality stability, workability in lamination and others and enabling a production efficiency of a liquid crystal display to be improved.

A pressure-sensitive adhesive layer or an adhesive layer can also be provided in an optical element of this invention. A pressure-sensitive layer can be used for adherence to a liquid crystal cell and in addition, is used in lamination of optical layers. In adherence of the optical film, the optical axis thereof can be set at a proper arrangement angle in adaptation for a retardation characteristic as a target.

In the polarizing plate mentioned above and the optical film in which at least one layer of the polarizing plate is laminated, an adhesive layer may also be prepared for adhesion with other members, such as a liquid crystal cell etc.

As the pressure sensitive adhesive agent or the adhesive agent is not especially limited. For example, polymers such as acrylic type polymers; silicone type polymers; polyesters, polyurethanes, polyamides, polyvinyl ethers, vinyl acetate/vinyl chloride copolymers, modified polyolefines, epoxy type; and rubber type such as fluorine type, natural rubber, synthetic rubber may be suitably selected as a base polymer. Especially, the one which is excellent in optical transparency, showing adhesion characteristics with moderate wettability, cohesiveness and adhesive property and has outstanding weather resistance, heat resistance, etc. may be preferably used.

The pressure sensitive adhesive agent or the adhesive agent adhesive may contain cross-linking agent according to a base polymer. And the adhesive agent adhesive may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

An adhesive agent and a pressure-sensitive adhesive agent each are usually used as an adhesive agent solution of a base polymer or a composition thereof dissolved or dispersed in a solvent at a solid matter concentration of the order in the range of from 10 to 50 wt %. An organic solvent can be properly selected from the group consisting of toluene, ethyl acetate and others; water; or others, so as to be adapted for a kind of an adhesive agent for use.

An adhesive layer and pressure-sensitive adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

EXAMPLES

Description will be given of the present invention showing examples, while this invention is not restricted to the examples shown below.

Note that as to a front retardation, a direction in which an in-plane refractive index is maximized is referred to as X axis, a direction perpendicular to the X axis as Y axis and the thickness direction of a film as Z axis, and refractive indexes in the axis directions as nx, ny and nz, respectively; and from the refractive indices nx, ny and nz at 550 nm measured with an automatic birefringence measuring instrument (manufactured by Oji Sceientific Instruments with a trade name of automatic birefringence meter KOBRA21ADH) and a thickness d (nm) of a retardation layer, a front retardation: (nx−ny)×d was calculated.

The retardation of the film inclined by 30° relative to the normal direction can be measured with the above automatic birefringence measuring instrument. The oblique retardation value is (nx−ny)×d in the inclined position of the film. The above automatic birefringence measuring instrument can be used for measurement at an incident angle of 0 to 50°. The retardation value at an incident angle of 60° was calculated by fitting. The retardation value of the circular-polarization-type-reflection polarizer (a) at an incident angle of 60° was specially obtained by calculation. The retardation value at an incident angle of 30° was also obtained by the same method as in the case of an incident angle of 60°.

A spectrophotometer (Instantaneous Multisystem MCPD-2000 manufactured by Otsuka Electronics Co., Ltd.) was used to measure a reflection spectrum, from which the wavelength band having half of the maximum reflectivity was determined as the reflection wavelength band.

Example 1

Circular-Polarization-Type-Reflection Polarizer (a)

A broadband cholesteric liquid crystal layer having a reflection wavelength band from 400 to 800 nm was used as the circular-polarization-type-reflection polarizer (a). The retardation of the broadband cholesteric liquid crystal layer was measured to be 100 nm with respect to incident light with a wavelength of 550 nm inclined by 30°.

A spectroscopic ellipsometer (M-220 manufactured by JASCO Corporation) was used to measure the retardation of a cholesteric liquid crystal layer with a center wavelength of 370 nm. By the retardation, the wavelength dispersion of the refractive index was calculated using the Cauchy's formula for approximation: Retardation=$a+b\lambda^2+c/\lambda^4$ (see FIG. 7). All these values were automatically calculated by the equipment.

Figure 7:
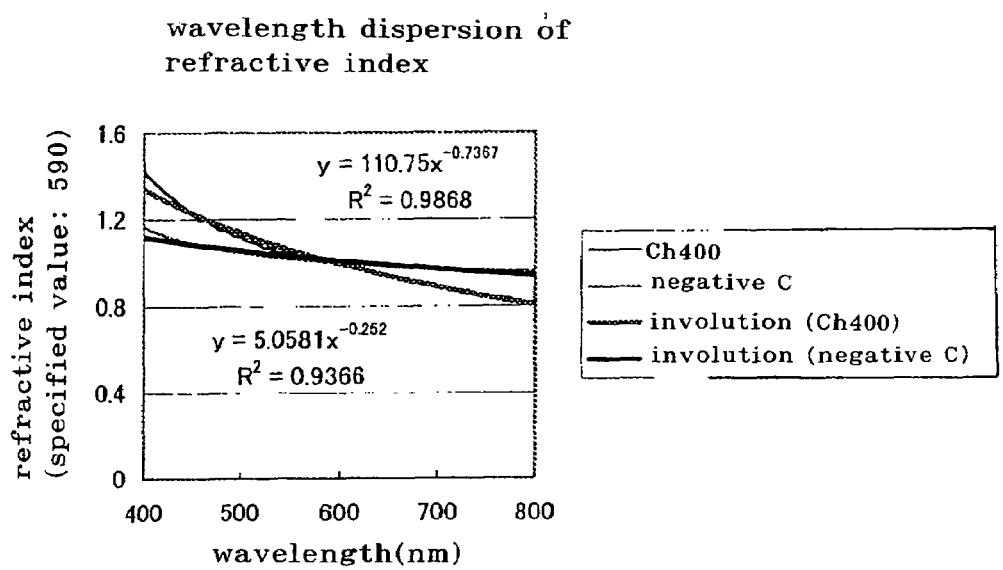
FIG. 7 is a graph showing wavelength dispersion characteristics of the refractive index of a circular-polarization-type-reflection polarizer (a cholesteric liquid crystal layer)
Figure 8:
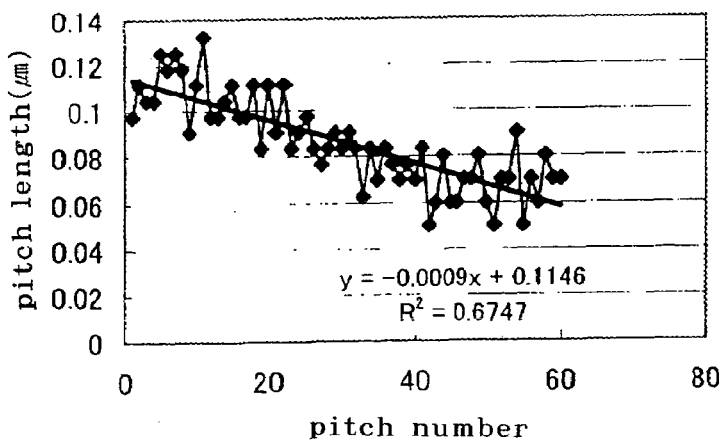
FIG. 8 is a graph showing variations in the pitch of the circular-polarization-type-reflection polarizer (the cholesteric liquid crystal layer)
Figure 9:
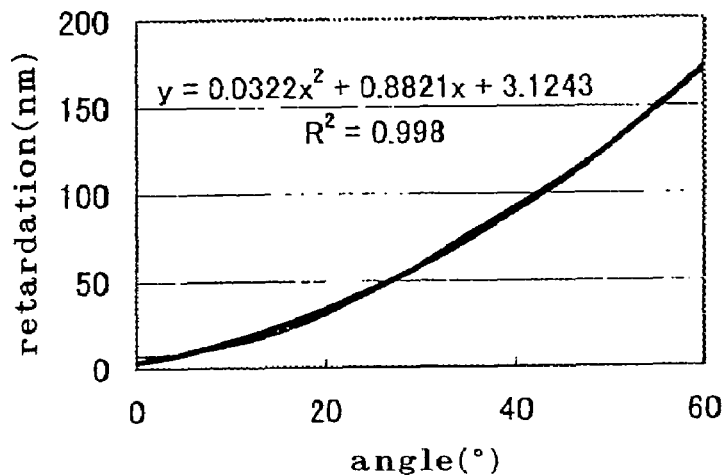
FIG. 9 is a graph for conversion of incident angles into the retardations of the circular-polarization-type-reflection polarizer (the cholesteric liquid crystal layer)

The result of cross-sectional TEM was used to determine variations in pitch length in the broadband cholesteric liquid crystal layer having a reflection wavelength band from 400 to 800 nm (see FIG. 8). At a wavelength of 550 nm, the width ($\Delta\lambda$) of the selective reflection band was calculated to be 48 nm from the formula: $\Delta\lambda=2\lambda(Ne-No)/(Ne+No)$, wherein Ne=1.685 and No=1.545. Thus, 550 nm±24 nm was reflected, the portion corresponds to pitch numbers from 32nd to 36th in FIG. 8. From the formula $\lambda$ (central wavelength)=$(Ne+No)\times p/2$, wherein (p) is a cholesteric pitch (μm), p/2 is calculated, and the corresponding ordinal number can be determined from FIG. 8. The sum of the pitch lengths of 32nd to 36th is 0.30 μm. Since the cholesteric liquid crystal layer has a thickness of 6 μm, the part with a thickness of 6−0.3=5.7 μm can serve as a retardation plate. Referring to FIG. 9, when light with a wavelength of 950 nm enters the cholesteric liquid crystal layer at an incident angle of 60°, a retardation of 172 nm can be generated (measured with the spectroscopic ellipsometer). The result of the wavelength dispersion as shown in FIG. 7 indicates that the specified values of the refractive index are 1.061 at a wavelength of 550 nm and 0.709 at a wavelength of 950 nm, respectively. Since a retardation of 172 nm is generated at a wavelength of 950 nm, a retardation of 172 nm×1.061/0.709=257.4 nm (calculated with $Y=110.75x^{-0.7367}$) can be generated at a wavelength of 550 nm. Thus, a retardation of about 260 nm can be generated at a wavelength of 550 nm, but a part where the pitch length matches the reflection wavelength cannot generate any retardation. The 5.7 μm part of the 6.0 μm cholesteric liquid crystal layer can serve as a retardation plate, and thus the cholesteric liquid crystal layer generates a retardation (nm) of 260 nm×5.70/6=247 nm with respect to light with a wavelength of 550 nm. Namely, a retardation of about 250 nm is generated when light with a wavelength of 550 nm enters at an incident angle of 60°.

(Retardation Layer (b))

A photopolymerizable nematic liquid crystal monomer (LC242 manufactured by BASF Ltd.), a chiral agent (LC756 manufactured by BASF Ltd.), a photoinitiator (Irgacure 907 manufactured by Ciba Specialty Chemicals Inc.), and a solvent (toluene) were prepared and mixed to form a coating liquid for providing a center wavelength of 350 nm for selective reflection. The coating liquid was applied to a commercially available polyethylene terephthalate film with a wire bar so as to provide a post-drying coating thickness of 4 μm, and then the solvent was dried off. Thereafter, the liquid crystal monomer was once heated to its isotropic transition temperature and then gradually cooled to form a layer having a uniform alignment state. The resulting film was exposed to UV so that the alignment state was fixed and a retardation layer (b) (a C-plate layer (negative)) was formed. With respect to light with a wavelength of 550 nm, the retardation of the C-plate was measured to be 2 nm in the front direction and to be 220 nm in the thickness direction. When the incident light was inclined by 30°, the retardation was measured to be 35 nm. When the incident light was inclined by 60°, the retardation was measured to be 75 nm. The C-plate layer was used as the retardation layer (b2).

(Optical Element (A))

A piece of the circular-polarization-type-reflection polarizer (a) was placed on the backlight side in such a manner that its side having a selective reflection band on the long wavelength side faced downward. The C-plate was laminated on the polarizer (a) via a 5 μm-thick adhesive. Another piece of the circular-polarization-type-reflection polarizer (a) was laminated on the C-plate via a 5 μm-thick adhesive in such a manner that its side having a selective reflection band on the long wavelength side faced downward. Four pieces of the C-plate were laminated thereon via a 5 μm-thick adhesive. The laminate of the four pieces of the C-plate had a retardation of 140 nm, which was a measurement with respect to incident light inclined by 30°. When incident light was inclined by 60°, the retardation was measured to be 300 nm. The laminate of the four pieces of the C-plate was used as the retardation layer (b1). A further piece of the circular-polarization-type-reflection polarizer (a) was laminated on the laminate via a 5 μm-thick adhesive in such a manner that its side having a selective reflection band on the long wavelength side faced downward so that an optical element (A) was obtained.

With respect to incident light inclined by 60° relative to the normal direction, the sum of the retardations that are generated was 325 nm and adjusted so as to be from $\lambda/4$ to $3\lambda/4$, where from the incident light is separated to polarized light by the first circular-polarization-type-reflection polarizer (a) from the light source side to the incident light is separated to polarized light through the first circular-polarization-type-reflection polarizer (a), the retardation layer (b2) and the second circular-polarization-type-reflection polarizer (a) in this order from the light source side.

With respect to incident light inclined by 30° relative to the normal direction, the sum of the retardations that are generated was 375 nm and adjusted so as to be from $\lambda/4$ to $3\lambda/4$, where from the incident light is separated to polarized light by the first circular-polarization-type-reflection polarizer (a) from the light source side to the incident light is separated to polarized light through the first circular-polarization-type-reflection polarizer (a), the retardation layer (b2), the second circular-polarization-type-reflection polarizer (a), the retardation layer (b1) and the third circular-polarization-type-reflection polarizer (a) in this order from the light source side.

A polycarbonate retardation plate (a $\lambda/4$ plate) with a front retardation of 130 nm was laminated on the optical element (A) via a 5 μm-thick adhesive. A backlight-side polarizing plate (SEG 1425DU manufactured by Nitto Denko Corporation) for a liquid crystal display was placed thereon in such a manner that the direction of its transmission axis was paralleled with the direction of the axis of the linearly polarized light to be transmitted so that a condensing and collimating system was formed. FIG. 4 is a schematic diagram showing the configuration of the product of Example 1. Referring to FIG. 4, the retardation layer (b2) relatively close to the backlight is a single layer of the C-plate on which the retardation layer (b1), which is a laminate of four layers of the C-plate, is provided. Reference character (B) represents the $\lambda/4$ plate, (C) the backlight-side polarizing plate, and (D) the backlight.

Comparative Example 1

The same broadband cholesteric liquid crystal layer as in Example 1 was used as the circular-polarization-type-reflection polarizer (a). The same C-plate layer as in Example 1 was also used.

A piece of the circular-polarization-type-reflection polarizer (a) was placed on the backlight side in such a manner that its side having a selective reflection band on the long wavelength side faced downward. Another piece of the circular-polarization-type-reflection polarizer (a) was laminated thereon via a 5 µm-thick adhesive in such a manner that its side having a selective reflection band on the long wavelength side faced downward. Four pieces of the C-plate were laminated thereon via a 5 µm-thick adhesive. The laminate of the four pieces of the C-plate was used as the retardation layer (b1). A further piece of the circular-polarization-type-reflection polarizer (a) was laminated on the laminate via a 5 µm-thick adhesive in such a manner that its side having a selective reflection band on the long wavelength side faced downward so that an optical element (A') was obtained.

Figure 5:
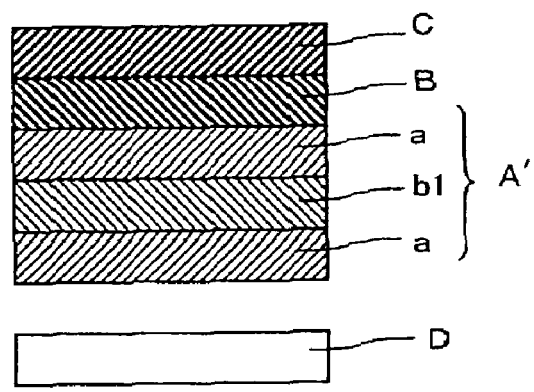
FIG. 5 is a cross-sectional view showing an example of the liquid crystal display of Comparative Example 1.

A polycarbonate retardation plate (a λ/4 plate) with a front retardation of 130 nm was laminated on the optical element (A') via a 5 µm-thick adhesive. A backlight-side polarizing plate (SEG 1425DU manufactured by Nitto Denko Corporation) for a liquid crystal display was placed thereon in such a manner that the direction of its transmission axis was paralleled with the direction of the axis of the linearly polarized light to be transmitted so that a condensing and collimating system was formed. FIG. 5 is a schematic diagram showing the configuration of the product of Comparative Example 1. Referring to FIG. 5, the retardation layer (b) is a laminate of four layers of the C-plate. Reference character (B) represents the λ/4 plate, (C) the backlight-side polarizing plate, and (D) the backlight.

Comparative Example 2

Figure 6:
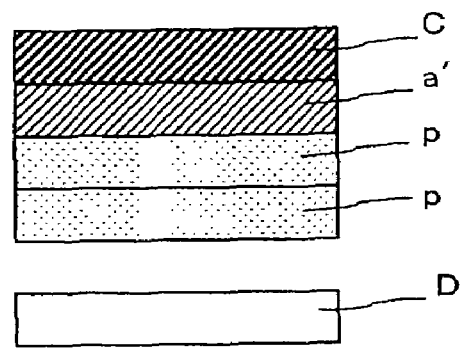
FIG. 6 is a cross-sectional view showing an example of the liquid crystal display of Comparative Example 2.

A linear-polarization-type-reflection polarizer (DBEF manufactured by 3M) was used as a reflection polarizer (a'). Two prism sheets (BEF manufactured by 3M) in perpendicular relation were placed on the light source side in such a manner that each prism side faced to the viewer side. The linear-polarization-type-reflection polarizer was then placed on the prism sheet (on the viewer side). A backlight-side polarizing plate (SEG 1425DU manufactured by Nitto Denko Corporation) for a liquid crystal display was placed thereon in such a manner that the direction of its transmission axis was paralleled with the direction of the axis of the linearly polarized light to be transmitted so that a condensing and collimating system was formed. FIG. 6 is a schematic diagram showing the configuration of the product of Comparative Example 2. Referring to FIG. 6, reference character (p) represents the prism sheet, (C) the backlight-side polarizing plate, and (D) the backlight.

(Evaluation)

Each condensing and collimating system was evaluated as described below. A light table was used as the backlight. Using EZ Contrast (manufactured by ELDIM Inc.), each system was evaluated for viewing-angle characteristics of brightness and coloration on chromaticity diagram depending on viewing angle.

The viewing-angle characteristics of brightness represent the relationship between brightness (cd/cm$^2$) and the viewing angle tilted from the front direction (0°). The characteristics show the brightness at any viewing angle.

The chromaticity diagram represents the relationship between the degree of the coloration and variations in viewing angle, which shows the color at any viewing angle. A larger shift distance represented by the line between points indicates a larger degree of coloration.

Figure 10:
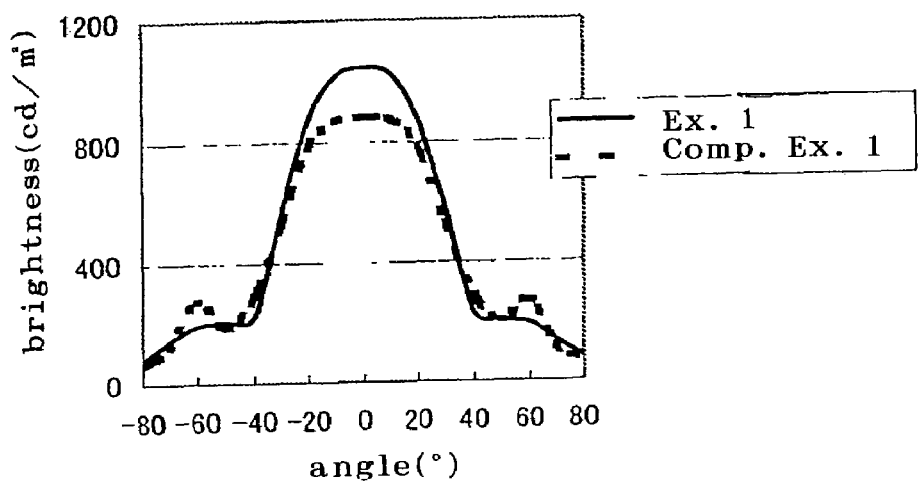
FIG. 10 is a graph showing viewing angle characteristics of the brightness of the products of Example 1 and Comparative Example 1.
Figure 11:
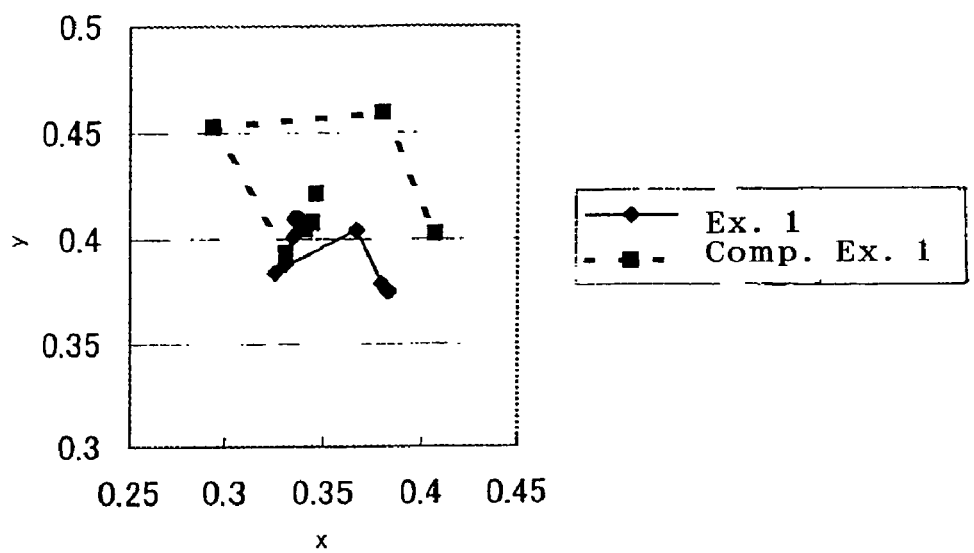
FIG. 11 is a graph showing chromaticity diagrams of the products of Example 1 and Comparative Example 1.

FIGS. 10 and 11 show the comparison between Example 1 and Comparative Example 1. FIG. 10 for the comparison of the viewing-angle characteristics of brightness indicates that the amount of transmission of light at large incident angles relative to the normal direction is smaller in Example 1 than in Comparative Example 1. The front brightness is higher in Example 1 than in Comparative Example 1. FIG. 11 is a chromaticity diagram in a case where the incident angle is increased from the normal direction in a stepwise manner and indicates that the point shift distance is smaller in Example 1 than in Comparative Example 1. Each point represents the color at each incident angle. A higher degree of coloring or a larger degree of coloration provides a larger point shift distance. From this, it is apparent that coloration is reduced in Example 1, while coloration is significant in Comparative Example 1.

Figure 12:
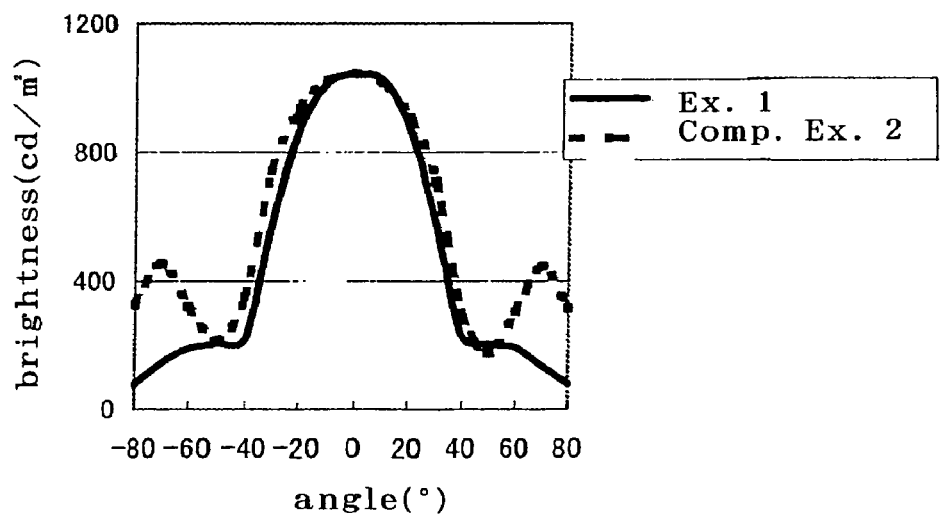
FIG. 12 is a graph showing viewing angle characteristics of the brightness of the products of Example 1 and Comparative Example 2.
Figure 13:
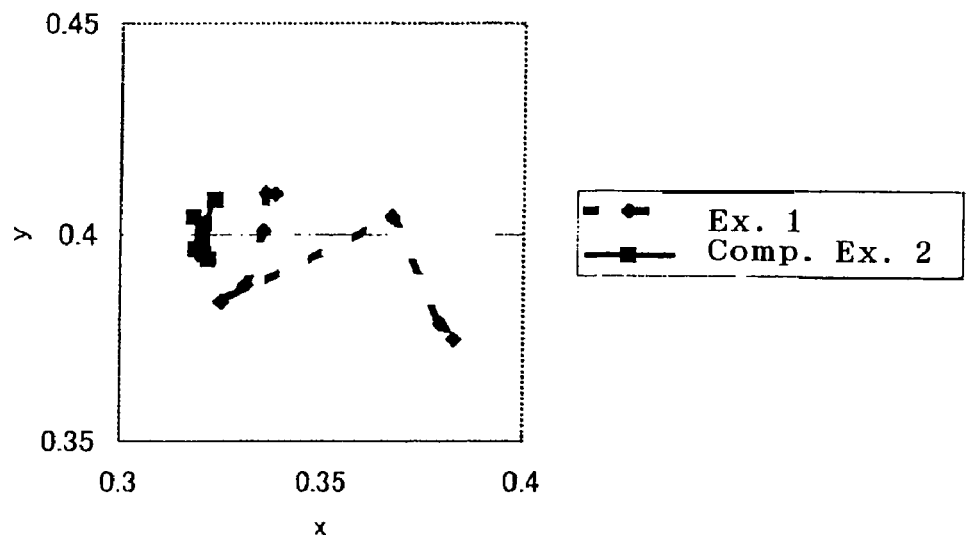
FIG. 13 is a graph showing chromaticity diagrams of the products of Example 1 and Comparative Example 2.

FIGS. 12 and 13 show the comparison between Example 1 and Comparative Example 2. FIG. 12 for the comparison of the viewing-angle characteristics of brightness indicates that the amount of transmission of light at large incident angles relative to the normal direction is significantly larger in Comparative Example 2 than in Example 1, Comparative Example 2 is insufficient for condensation. FIG. 13 is a chromaticity diagram in a case where the incident angle is increased from the normal direction in a stepwise manner and indicates that the point shift distance is smaller in Comparative Example 2 than in Example 1. Each point represents the color at each incident angle, and a higher degree of coloring or a larger degree of coloration provides a larger point shift distance. From this, it is apparent that the degree of coloring is smaller in Comparative Example 2. However, the product of Example 1 had a thickness of 70 µm (the thickness of the circular-polarization-type-reflection polarizers, the adhesive and the retardation layers), while the product of Comparative Example 2 was as thick as hundreds micrometers. The product of Comparative Example 2 had poor handleability because it needed an air interface.

Table 1 provides a summary of the evaluations. For each evaluation, ○ ○ means "very good," ○ "good," ▲ "acceptable," and x "unsatisfactory."

TABLE 1

| | Front Brightness | Condensing | Coloration | Thickness | Handleability |
|---|---|---|---|---|---|
| Example 1 | ○ | ○ | ○ | ○ | ○ |
| Comparative Example 1 | ▲ | ▲ | ▲ | ○ | ○ |
| Comparative Example 2 | ○ | ▲ | ○○ | x | x |

Example 2

Circular-Polarization-Type-Reflection Polarizer (a)

The same broadband cholesteric liquid crystal layer as in Example 1 was used as the circular-polarization-type-reflection polarizer (a).

(Retardation Layer (b))

A photopolymerizable nematic liquid crystal monomer (LC242 manufactured by BASF Ltd.), a chiral agent (LC756 manufactured by BASF Ltd.), a photoinitiator (Irgacure 907 manufactured by Ciba Specialty Chemicals Inc.), and a solvent (toluene) were prepared and mixed to form a coating liquid for providing a center wavelength of 350 nm for selective reflection. The coating liquid was applied to a commercially available polyethylene terephthalate film with a wire bar so as to provide a post-drying coating thickness of 3 μm, and then the solvent was dried off. Thereafter, the liquid crystal monomer was once heated to its isotropic transition temperature and then gradually cooled to form a layer having a uniform alignment state. The resulting film was exposed to UV so that the alignment state was fixed and a retardation layer (b) (a C-plate layer (negative)) was formed. With respect to light with a wavelength of 550 nm, the retardation of the C-plate was measured to be 2 nm in the front direction and to be 150 nm in the thickness direction. When the incident light was inclined by 30°, the retardation was measured to be 25 nm. When the incident light was inclined by 60°, the retardation was measured to be 60 nm. The C-plate layer was used as the retardation layer (b2).

(Optical Element (A))

A piece of the circular-polarization-type-reflection polarizer (a) was placed on the backlight side in such a manner that its side having a selective reflection band on the long wavelength side faced downward. The C-plate was laminated on the polarizer (a) via a 5 μm-thick adhesive. Another piece of the circular-polarization-type-reflection polarizer (a) was laminated on the C-plate via a 5 μm-thick adhesive in such a manner that its side having a selective reflection band on the long wavelength side faced downward. Four pieces of the C-plate were laminated thereon via a 5 μm-thick adhesive. The laminate of the four pieces of the C-plate had a retardation of 100 nm, which was a measurement with respect to incident light inclined by 30°. When incident light was inclined by 60°, the retardation was measured to be 240 nm. The laminate of the four pieces of the C-plate was used as the retardation layer (b1). A further piece of the circular-polarization-type-reflection polarizer (a) was laminated on the laminate via a 5 μm-thick adhesive in such a manner that its side having a selective reflection band on the long wavelength side faced downward so that an optical element (A) was obtained.

With respect to incident light inclined by 60° relative to the normal direction, the sum of the retardations that are generated was 310 nm and adjusted so as to be from λ/4 to 3λ/4, where from the incident light is separated to polarized light by the first circular-polarization-type-reflection polarizer (a) from the light source side to the incident light is separated to polarized light through the first circular-polarization-type-reflection polarizer (a), the retardation layer (b2) and the second circular-polarization-type-reflection polarizer (a) in this order from the light source side.

With respect to incident light inclined by 30° relative to the normal direction, the sum of the retardations that are generated was 325 nm and adjusted so as to be from λ/4 to 3λ/4, where from the incident light is separated to polarized light by the first circular-polarization-type-reflection polarizer (a) from the light source side to the incident light is separated to polarized light through the first circular-polarization-type-reflection polarizer (a), the retardation layer (b2), the second circular-polarization-type-reflection polarizer (a), the retardation layer (b1) and the third circular-polarization-type-reflection polarizer (a) in this order from the light source side.

A polycarbonate retardation plate (a λ/4 plate) with a front retardation of 130 nm was laminated on the optical element (A) via a 5 μm-thick adhesive. A backlight-side polarizing plate (SEG 1425DU manufactured by Nitto Denko Corporation) for a liquid crystal display was placed thereon in such a manner that the direction of its transmission axis was paralleled with the direction of the axis of the linearly polarized light to be transmitted so that a condensing and collimating system was formed. FIG. 4 is a schematic diagram showing the configuration of the product of Example 2. Referring to FIG. 4, the retardation layer (b2) relatively close to the backlight is a single layer of the C-plate on which the retardation layer (b1), which is a laminate of four layers of the C-plate, is provided. Reference character (B) represents the λ/4 plate, (C) the backlight-side polarizing plate, and (D) the backlight.

(Evaluation)

Figure 14:
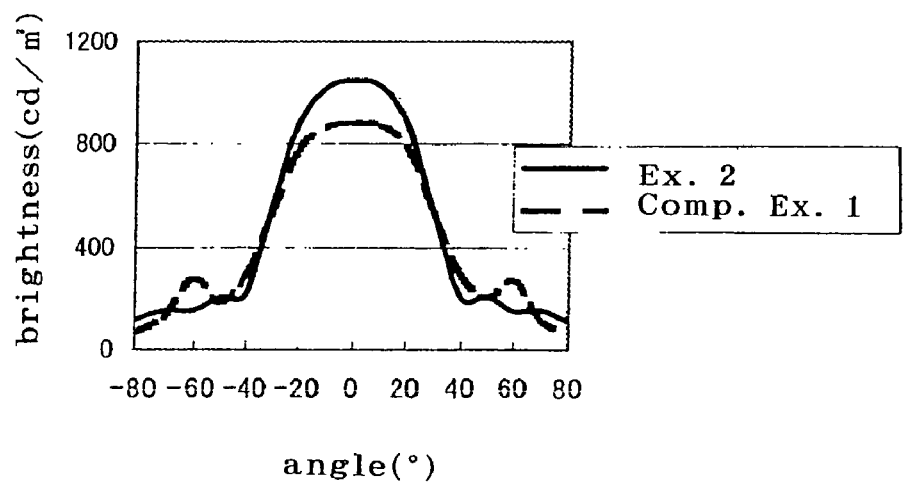
FIG. 14 is a graph showing viewing angle characteristics of the brightness of the products of Example 2 and Comparative Example 1.
Figure 15:
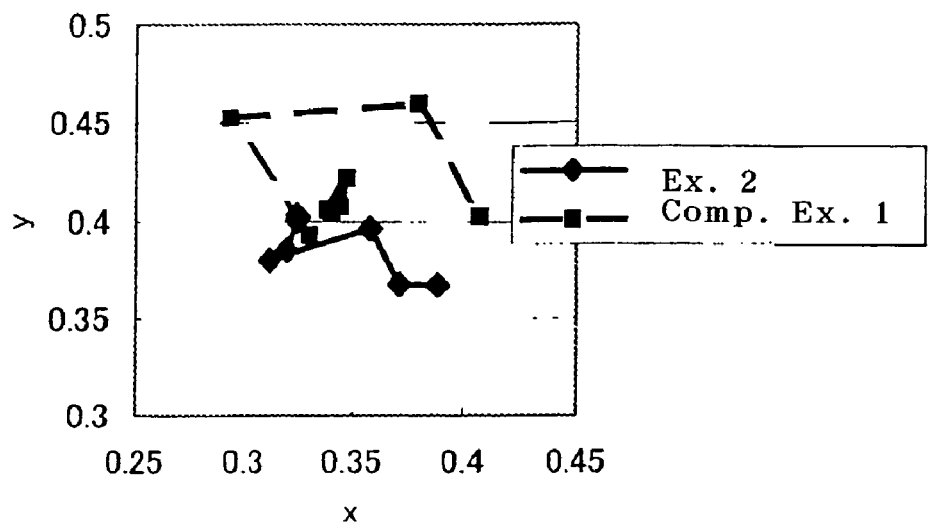
FIG. 15 is a graph showing chromaticity diagrams of the products of Example 2 and Comparative Example 1.

The resulting condensing and collimating system was evaluated in the same manner as described above. FIGS. 14 and 15 show the comparison between Example 2 and Comparative Example 1. FIG. 14 for the comparison of the viewing-angle characteristics of brightness indicates that the amount of transmission of light at large incident angles relative to the normal direction is smaller in Example 2 than in Comparative Example 1. The front brightness is higher in Example 2 than in Comparative Example 1. FIG. 15 is a chromaticity diagram in a case where the incident angle is increased from the normal direction in a stepwise manner and indicates that the point shift distance is smaller in Example 2 than in Comparative Example 1. Each point represents the color at each incident angle. A higher degree of coloring or a larger degree of coloration provides a larger point shift distance. From this, it is apparent that coloration is reduced in Example 2, while coloration is significant in Comparative Example 1.

Example 3

Circular-Polarization-Type-Reflection Polarizer (a) and Retardation Plate (B)

The same broadband cholesteric liquid crystal layer as in Example 1 was used as the circular-polarization-type-reflection polarizer (a). The same C-plate layer as in Example 1 was also used. However, a linear-polarization-type-reflection polarizer (DBEF manufactured by 3M) and a polycarbonate retardation plate (a λ/4 plate) with a front retardation of 130 nm were laminated with a 5 μm-thick adhesive, and the laminate was used as the third circular-polarization-type-reflection polarizer (a) from the backlight side.

(Optical Element (A))

A piece of the same circular-polarization-type-reflection polarizer (a) as in Example 1 was placed on the backlight side in such a manner that its side having a selective reflection band on the long wavelength side faced downward. The same C-plate as in Example 1 was laminated on the polarizer (a) via a 5 μm-thick adhesive. The C-plate corresponds to the retardation layer (b2). Another piece of the same circular-polarization-type-reflection polarizer (a) as in Example 1 was laminated on the C-plate via a 5 μm-thick adhesive in such a manner that its side having a selective reflection band on the long wavelength side faced downward. Four pieces of the C-plate were laminated thereon via a 5 μm-thick adhesive. The laminate of the four pieces of the C-plate corresponds to the retardation layer (b1). The polycarbonate retardation plate (the λ/4 plate) with a front retardation of 130 nm was laminated thereon via a 5 μm-thick adhesive. The linear-polarization-type-reflection polarizer (DBEF manufactured by 3M) was further laminated thereon via a 5 μm-thick adhesive to form an optical element (A). In this laminating process, the direction of the transmission axis of the linear-polarization-type-reflection polarizer was paralleled with the direction of the axis of the linearly polarized light to be transmitted.

With respect to incident light inclined by 60° relative to the normal direction, the sum of the retardations that are generated was 325 nm and adjusted so as to be from $\lambda/4$ to $3\lambda/4$, where from the incident light is separated to polarized light by the first circular-polarization-type-reflection polarizer (a) from the light source side to the incident light is separated to polarized light through the first circular-polarization-type-reflection polarizer (a), the retardation layer (b2) and the second circular-polarization-type-reflection polarizer (a) in this order from the light source side.

With respect to incident light inclined by 30° relative to the normal direction, the sum of the retardations that are generated was 319 nm and adjusted so as to be from $\lambda/4$ to $3\lambda/4$, where from the incident light is separated to polarized light by the first circular-polarization-type-reflection polarizer (a) from the light source side to the incident light is separated to polarized light through the first circular-polarization-type-reflection polarizer (a), the retardation layer (b2), the second circular-polarization-type-reflection polarizer (a) and the retardation layer (b1) in this order from the light source side. This retardation was calculated by subtracting, from the result of Example 1, the retardation that was generated where the incident light is separated to polarized light by the third circular-polarization-type-reflection polarizer (a). This is because the linear-polarization-type-reflection polarizer generates no retardation.

The following method is used to calculate the retardation that is generated where the incident light is separated to polarized light by the third circular-polarization-type-reflection polarizer (a). Example 1 indicates that light with a wavelength of 550 nm is reflected by the layers of 32nd to 36th in the cholesteric liquid crystal layer. Thus, the retardation that is generated where the light passes through the layers of 1st to 31st corresponds to the retardation that is generated where the light is separated to polarized light by the third circular-polarization-type-reflection polarizer (a). From FIG. 8, the sum of the pitch lengths of 1st to 31st is 3.2 µm. In Example 1, the cholesteric liquid crystal layer generates a retardation of 100 nm with respect to light at an incident angle of 30°, and the 5.7 µm-thick part serves to generate the retardation. Thus, the 3.2 µm-thick part can generate a retardation of 100×3.2/5.7=56.1 (nm). In Example 3, the retardation of this part is not generated, and thus, a retardation of 375−56=319 (nm) is generated with respect to light at an incident angle of 30° relative to the normal direction.

A backlight-side polarizing plate (SEG 1425DU manufactured by Nitto Denko Corporation) for a liquid crystal display was placed thereon in such a manner that the direction of its transmission axis was paralleled with the direction of the axis of the linearly polarized light to be transmitted so that a condensing and collimating system was formed. The product of Example 3 has the configuration as shown in FIG. 4, except that it does not have the $\lambda/4$ plate (B). Referring to FIG. 4, the retardation layer (b2) relatively close to the backlight is a single layer of the C-plate on which the retardation layer (b1), which is a laminate of four layers of the C-plate, is provided. Reference character (C) represents the backlight-side polarizing plate, and (D) the backlight. The third circular-polarization-type-reflection polarizer (a) from the backlight side is a laminate consisting of the retardation plate ($\lambda/4$ plate) and the linear-polarization-type-reflection polarizer in this order.

(Evaluation)

Figure 16:
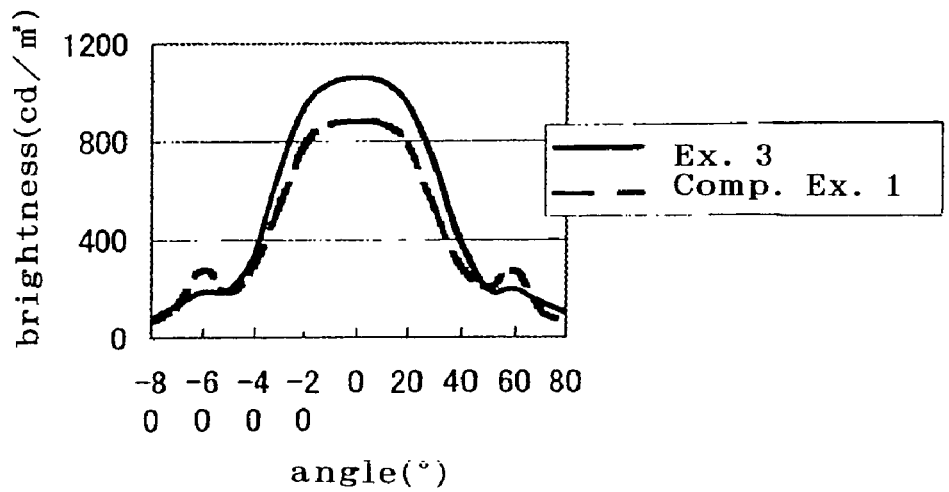
FIG. 16 is a graph showing viewing angle characteristics of the brightness of the products of Example 3 and Comparative Example 1.
Figure 17:
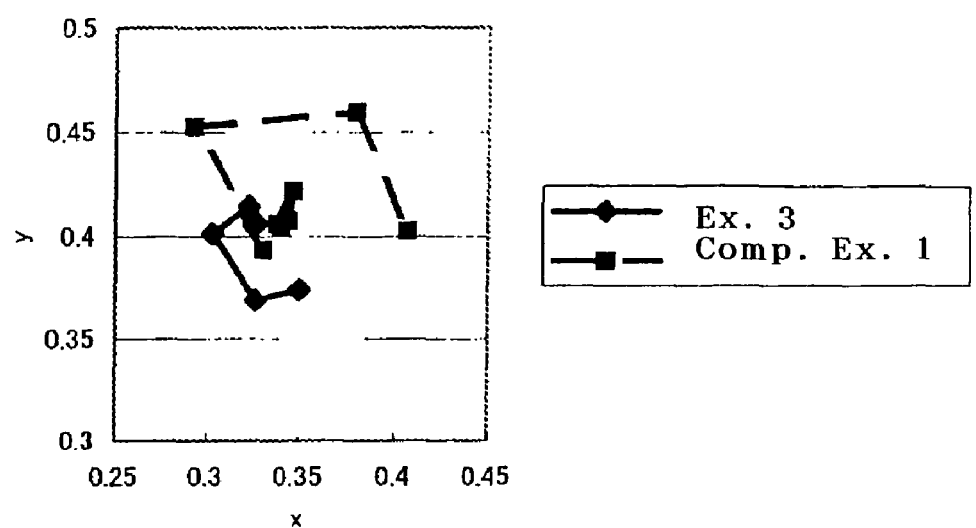
FIG. 17 is a graph showing chromaticity diagrams of the products of Example 3 and Comparative Example 1.

The resulting condensing and collimating system was evaluated in the same manner as described above. FIGS. 16 and 17 show the comparison between Example 3 and Comparative Example 1. FIG. 16 for the comparison of the viewing-angle characteristics of brightness indicates that the amount of transmission of light at large incident angles relative to the normal direction is smaller in Example 3 than in Comparative Example 1. The front brightness is higher in Example 3 than in Comparative Example 1. FIG. 17 is a chromaticity diagram in a case where the incident angle is increased from the normal direction in a stepwise manner and indicates that the point shift distance is smaller in Example 3 than in Comparative Example 1. Each point represents the color at each incident angle, and a higher degree of coloring or a larger degree of coloration provides a larger point shift distance. From this, it is apparent that coloration is reduced in Example 3, while coloration is significant in Comparative Example 1.

INDUSTRIAL APPLICABILITY

The optical element of the invention using the circular-polarization-type-reflection polarizer is preferably used for condensing backlight systems and liquid crystal displays.

The invention claimed is:

1. An optical element, comprising:
   at least three laminated circular-polarization-type-reflection polarizers (a) whose wavelength bands for selective reflection of polarized light overlap one another;
   a layer (b1) which is placed between at least a pair of the circular-polarization-type-reflection polarizers (a) and has a front retardation of substantially zero (in the normal direction) and a retardation of at least $\lambda/8$ with respect to incident light inclined by at least 30° relative to the normal direction; and
   a layer (b2) which is placed between at least another pair of the circular-polarization-type-reflection polarizers (a) and has a front retardation of substantially zero (in the normal direction) and a retardation of at most $\lambda/2$ with respect to incident light inclined by 60° relative to the normal direction.

2. The optical element according to claim 1, wherein the circular-polarization-type-reflection polarizer (a), the retardation layer (b1), the circular-polarization-type-reflection polarizer (a), the retardation layer (b2) and the circular-polarization-type-reflection polarizer (a) are laminated in this order.

3. The optical element according to claim 1, wherein
   the circular-polarization-type-reflection polarizer (a), the retardation layer (b1), the circular-polarization-type-reflection polarizer (a), the retardation layer (b2) and the circular-polarization-type-reflection polarizer (a) are arranged and laminated in this order from a light source side,
   the sum of retardations that are generated with respect to incident light inclined by at least 30° relative to the normal direction is adjusted to be from $\lambda/4+\lambda n$ to $3\lambda/4+\lambda n$, wherein n is an integer of 0 or more, where from the incident light is separated to polarized light by the first circular-polarization-type-reflection polarizer (a) from the light source side to the incident light is separated to polarized light through the first circular-polarization-type-reflection polarizer (a), the retardation layer (b1) and the second circular-polarization-type-reflection polarizer (a) in this order from the light source side, and the sum of retardations that are generated with respect to incident light inclined by 60° relative to the normal direction is adjusted to be from $\lambda/4+\lambda n$ to $3\lambda/4+\lambda n$, wherein n is an integer of 0 or more, where from the incident light is separated to polarized light by the first circular-polarization-type-reflection polarizer (a) from the light source side to the incident light is separated to polarized light through the first circular-polarization-type-reflection polarizer (a), the retardation layer (b1), the second circular-polarization-type-reflection polarizer (a), the retardation layer (b2) and the third circular-polarization-type-reflection polarizer (a) in this order from the light source side.

4. The optical element according to claim 1, wherein
the circular-polarization-type-reflection polarizer (a), the retardation layer (b2), the circular-polarization-type-reflection polarizer (a), the retardation layer (b1) and the circular-polarization-type-reflection polarizer (a) are arranged and laminated in this order from a light source side,
the sum of retardations that are generated with respect to incident light inclined by 60° relative to the normal direction is adjusted to be from $\lambda/4+\lambda n$ to $3\lambda/4+\lambda n$, wherein n is an integer of 0 or more, where from the incident light is separated to polarized light by the first circular-polarization-type-reflection polarizer (a) from the light source side to the incident light is separated to polarized light through the first circular-polarization-type-reflection polarizer (a), the retardation layer (b2) and the second circular-polarization-type-reflection polarizer (a) in this order from the light source side, and
the sum of retardations that are generated with respect to incident light inclined by at least 30° relative to the normal direction is adjusted to be from $\lambda/4+\lambda n$ to $3\lambda/4+\lambda n$, wherein n is an integer of 0 or more, where from the incident light is separated to polarized light by the first circular-polarization-type-reflection polarizer (a) from the light source side to the incident light is separated to polarized light through the first circular-polarization-type-reflection polarizer (a), the retardation layer (b2), the second circular-polarization-type-reflection polarizer (a), the retardation layer (b1) and the third circular-polarization-type-reflection polarizer (a) in this order from the light source side.

5. The optical element according to claim 1, wherein the selective reflection wavelength of the at least three circular-polarization-type-reflection polarizers (a) are overlapped in the wavelength range of 550 nm±10 nm.

6. The optical element according to claim 1, wherein the circular-polarization-type-reflection polarizer (a) comprises a cholesteric liquid crystal material.

7. The optical element according to claim 1, wherein the retardation layer (b1) and/or the retardation layer (b2) is at least one selected from the group consisting of:
a layer of a cholesteric liquid crystal phase having a selective reflection wavelength band in a range other than the visible light range and having a fixed planar alignment;
a layer of a rod-like liquid crystal having a fixed homeotropic alignment state;
a layer of a discotic liquid crystal having a fixed alignment state of a nematic phase or a columnar phase;
a layer of a biaxially-oriented polymer film;
a layer of a negative uniaxial inorganic layered compound having an optical axis aligned and fixed in the normal direction of a plane; and
a film produced with at least one polymer selected from the group consisting of polyamide, polyimide, polyester, poly(etherketone), poly(amide-imide), and poly(ester-imide).

8. The optical element according to claim 1, further comprising a $\lambda/4$ plate which is placed on the circular-polarization-type-reflection polarizer (a) provided on a viewer side (liquid crystal side) such that transmitted light from a light source side can provide linearly polarized light.

9. The optical element according to claim 8, further comprising a polarizing plate which is placed on the $\lambda/4$ plate side in such a manner that the direction of the transmission axis of the polarizing plate is parallel with the direction of the axis of the linearly polarized light to be transmitted from the light source side.

10. The optical element according to claim 1, wherein each layer is laminated with a transparent adhesive or pressure-sensitive adhesive.

11. A condensing backlight system, comprising:
the optical element according to claim 1; and
at least a light source provided for the optical element.

12. A liquid crystal display, comprising:
the condensing backlight system according to claim 11; and
at least a liquid crystal cell provided for the system.

13. A liquid crystal display, comprising:
the liquid crystal display according to claim 12; and
a diffusing plate which exhibits neither backward scattering nor depolarization and is laminated on a viewer side of the liquid crystal cell.

* * * * *